No. 683,083. Patented Sept. 24, 1901.
E. N. THOMAS & G. L. THOMPSON.
FRUIT DRIER.
(Application filed Feb. 26, 1901.)
(No Model.)
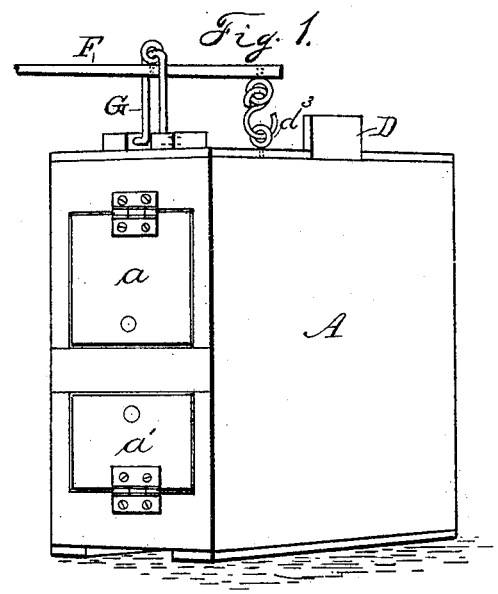
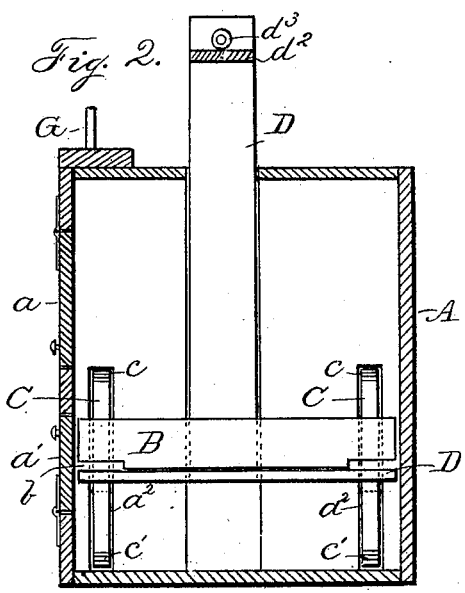
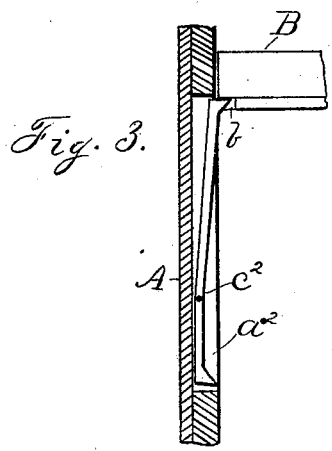
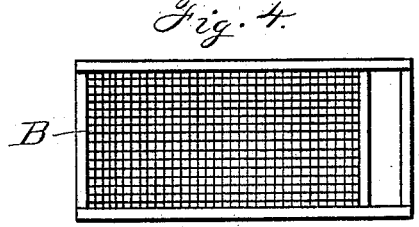
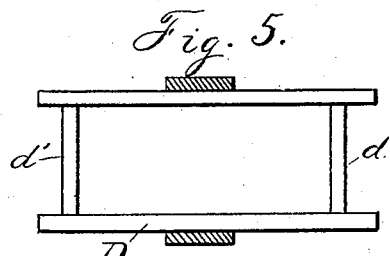
WITNESSES:
Chas. P. Smith
Edgar Adams
INVENTORS:
E. N. Thomas & G. L. Thompson
BY Thomas P. Simpson
ATTORNEY

UNITED STATES PATENT OFFICE.

ERASTUS N. THOMAS AND GAMALIEL L. THOMPSON, OF JEFFERSON, OREGON.

FRUIT-DRIER.

SPECIFICATION forming part of Letters Patent No. 683,083, dated September 24, 1901.

Application filed February 26, 1901. Serial No. 48,910. (No model.)

*To all whom it may concern:*

Be it known that we, ERASTUS N. THOMAS and GAMALIEL L. THOMPSON, residing at Jefferson, in the county of Marion and State of Oregon, have invented certain new and useful Improvements in Fruit-Driers; and we do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to stack-driers where the trays rest on one another, and has for its special object to bring the fruit down gradually to a maximum of heat, so as to preserve the natural flavor and yet dry it perfectly. We use a tunnel in which the trays are inserted at an upper door and removed at a lower one, being supported by props which are pushed into grooves by a vertically-sliding trip to let the lowest tray down to the lower door, where it is removed.

Figure 1 of the drawings is an elevation in perspective to show the two front doors of the drier and the lever by which the tripper is operated; Fig. 2, a side vertical section showing the position of the tray-props at the farther side and a tray on the frame; Fig. 3, a side elevation of a prop and adjacent parts, partly in section; Fig. 4, a plan view of a tray on which the fruit is held while in the drier, and Fig. 5 is a plan of the lower part of the frame.

In the drawings, A represents our tunnel-drier with the two front doors $a\ a'$, one above the other, and B the trays, the latter being preferably made with wire-mesh bottoms to allow the uprising hot air to pass therethrough.

C represents the four stack-props, made with a head or catch $c$ at the upper end, which are intended to support the stack of trays, and a projection $c'$ at the lower end on the same side, for a purpose hereinafter described.

D is a horizontal frame to support all the trays until the bottom one is separated from the others, to trip the props, and to throw out the heads or catches $c$ to support all but the bottom tray by striking the foot $c'$.

The props C are made on a very obtuse angle $c^2$, the upper arm carrying the head $c$, while the lower arm carries the foot or projection $c'$. This allows them when placed in the grooves $a^2$ to be operated by the trip-frame, so that the heads on its upward movement will be made to disappear in their grooves and allow said frame to support the stack of trays. Then on the downward movement of the frame D it strikes the feet $c'$ and forces the heads $c$ to push out into the tray-notches $b$ of the tray that is next to the last. This allows the bottom tray to lie loose on the frame D before the lower door $a'$, ready to be taken out, while another tray is put in through the upper door $a$.

The trip-frame D is connected by parallel bars $d'\ d'$ with a cross-bar $d^2$, to which is connected by a hook and eye $d^3$ the front end of a lever F. The latter is pivoted on a fulcrum-piece G, so that its free end will project over the front of the drier, where it can be manipulated by the attendant.

What we claim as new is—

A fruit-drier having a tunnel with the doors $a\ a'$ and grooves $a^2$, the trays B provided with the notches $b$, the obtuse-angled stack-props having the upper catches $c$ and lower projections $c'$, the trip-frame D movable up and down to act upon said catches and projections in the grooves $a^2$ and the trip-lever F, all combined constructed and arranged substantially in the manner and for the purpose set forth.

In testimony whereof we affix our signatures in presence of two witnesses.

ERASTUS N. THOMAS.
GAMALIEL L. THOMPSON.

Witnesses:
T. M. WITTEN,
B. F. BLACKWELL.